Oct. 17, 1961 N. HAGEN 3,004,285
HOLLOW PLASTIC ARTICLES AND THEIR MANUFACTURE
Filed May 18, 1959 5 Sheets-Sheet 1
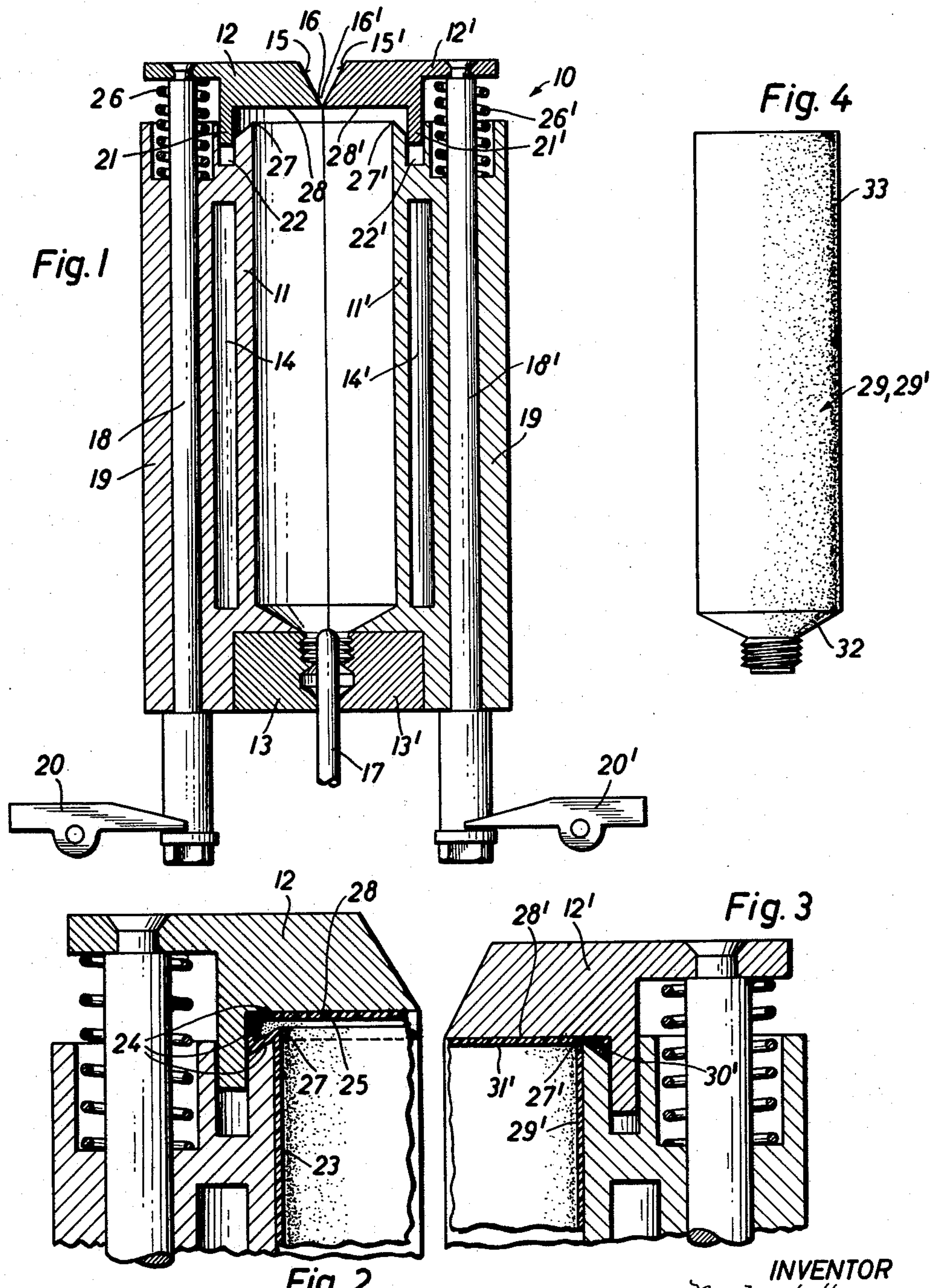
INVENTOR
Norbert Hagen
BY Richard [illegible]
Agt HOLLOW PLASTIC ARTICLES AND THEIR MANUFACTURE
Filed May 18, 1959 5 Sheets-Sheet 2
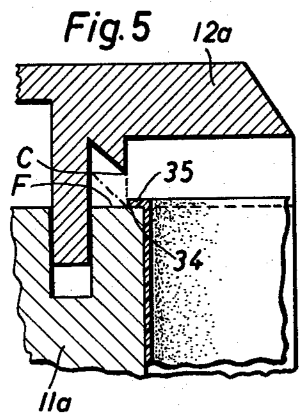
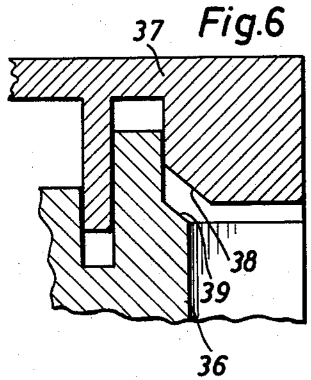
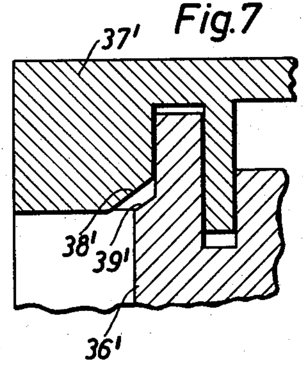
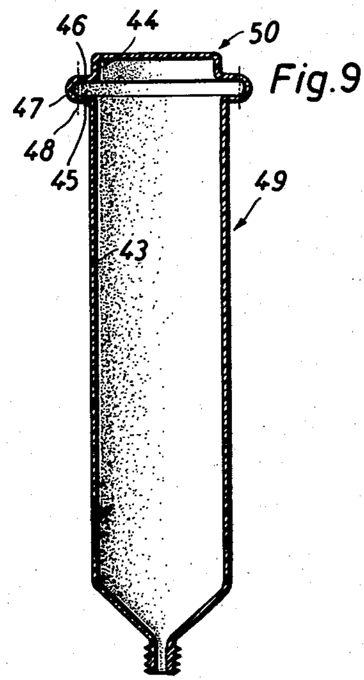
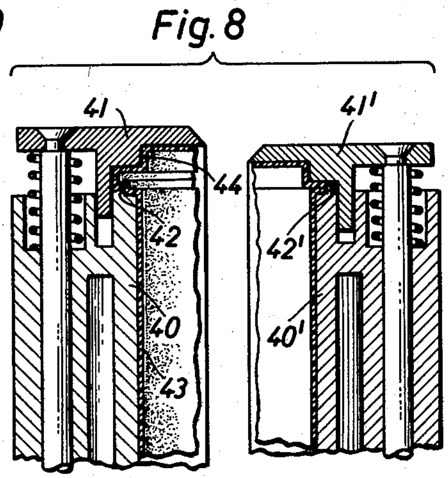
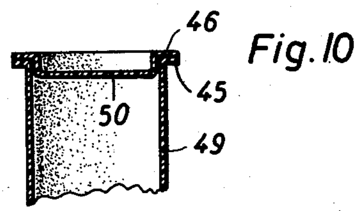
INVENTOR
Norbert Hagen
BY [signature]
Ag't

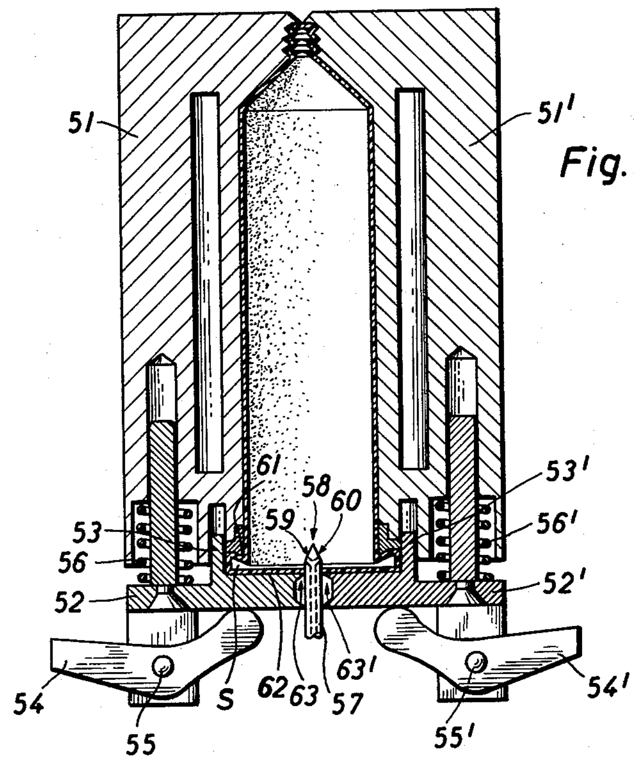
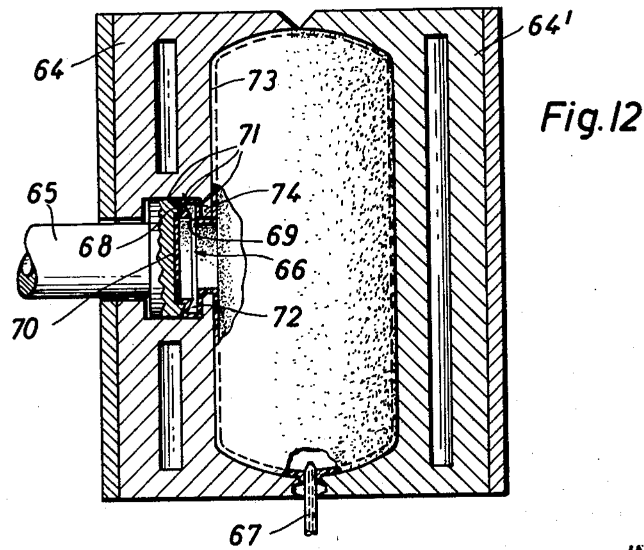
INVENTOR
Norbert Hagen
BY Richard Lund
Ag't

HOLLOW PLASTIC ARTICLES AND THEIR MANUFACTURE
Filed May 18, 1959 5 Sheets-Sheet 4
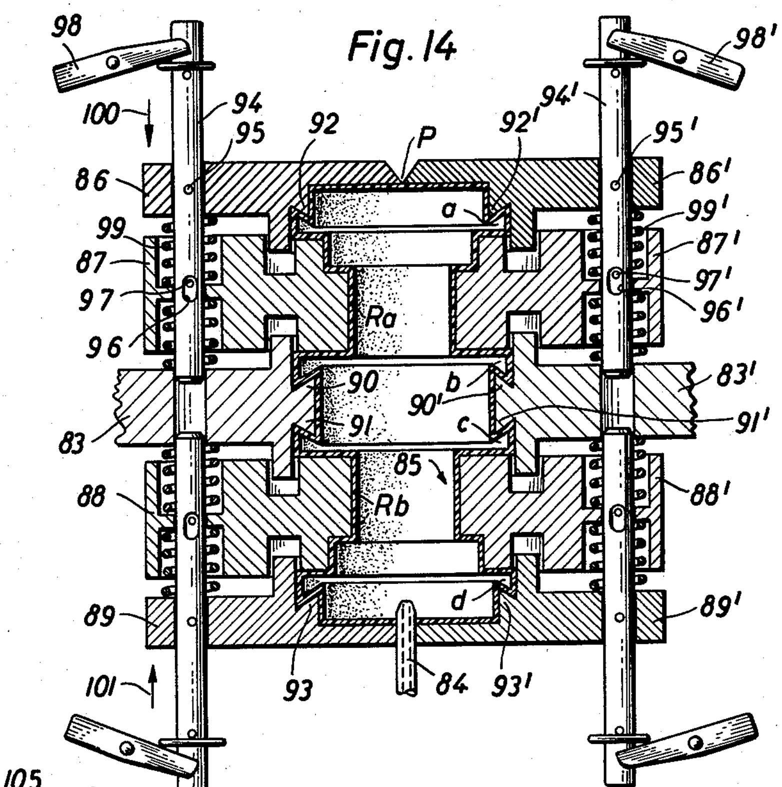
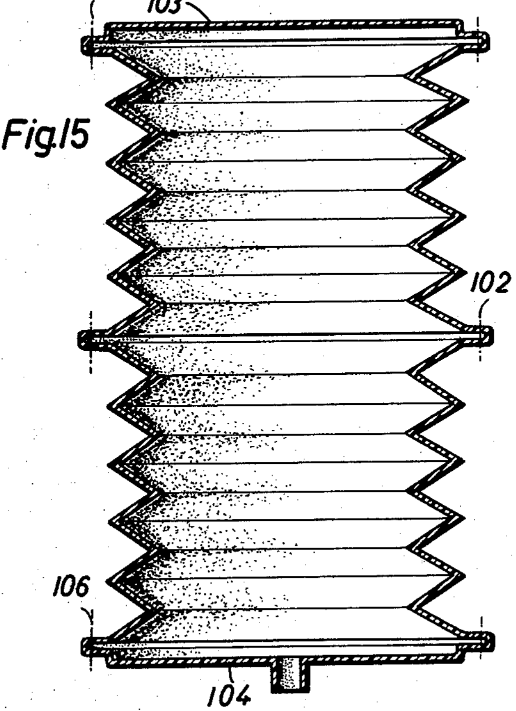
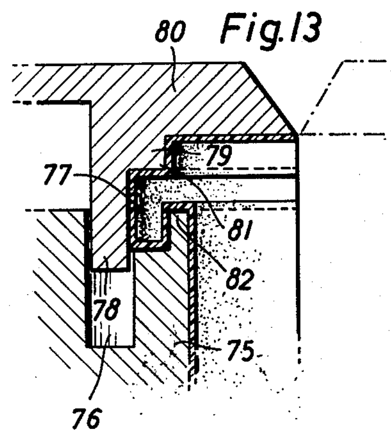
INVENTOR
Norbert Hagen
BY Richard ... Ag't HOLLOW PLASTIC ARTICLES AND THEIR MANUFACTURE
Filed May 18, 1959 5 Sheets-Sheet 5
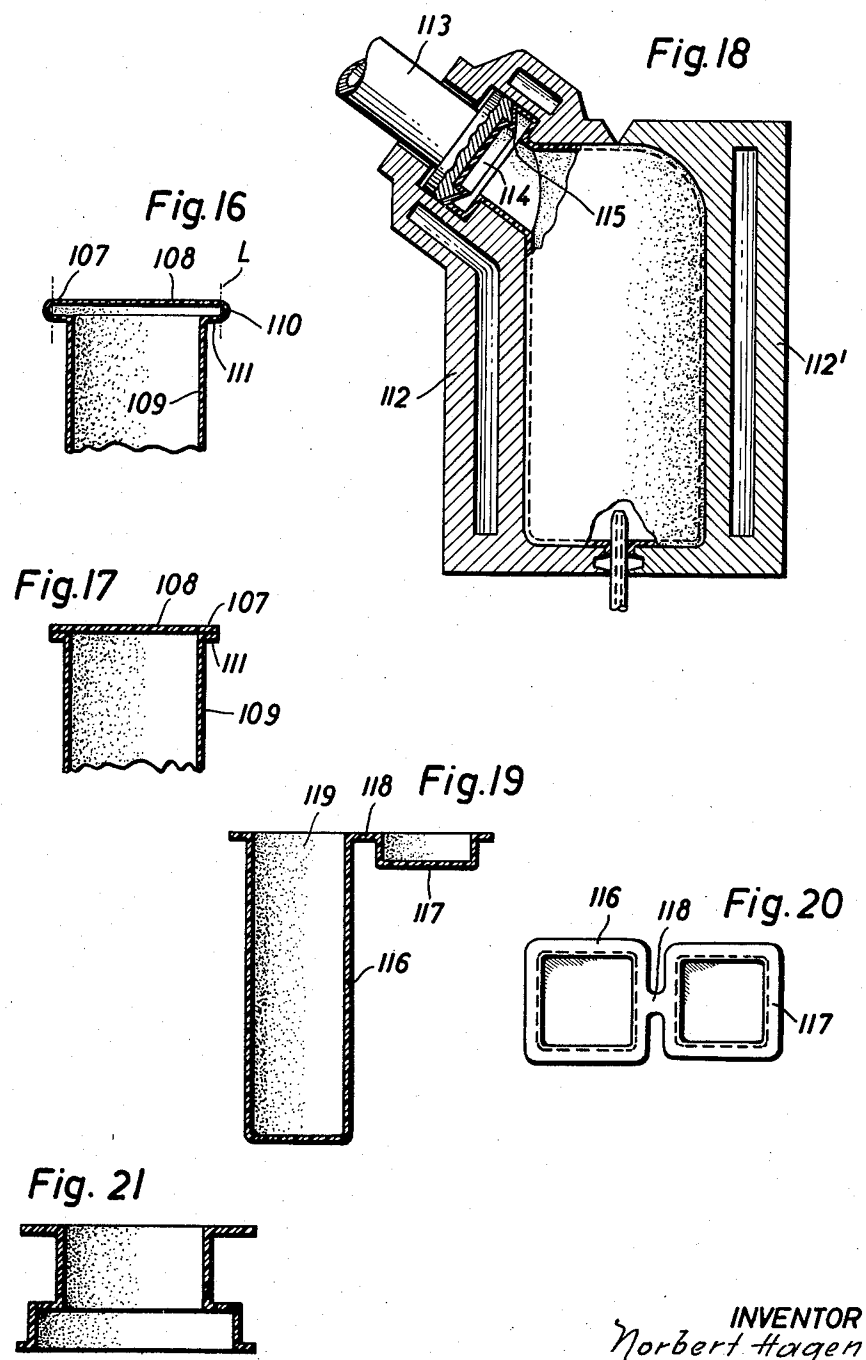
INVENTOR
Norbert Hagen
BY Richard Low
Ag't United States Patent Office 3,004,285

Patented Oct. 17, 1961

3,004,285
HOLLOW PLASTIC ARTICLES AND THEIR MANUFACTURE

Norbert Hagen, Siegburg, Rhineland, Germany, assignor to Reinold Hagen, Hangelar uber Siegburg, Rhineland, Germany Filed May 18, 1959, Ser. No. 814,088
Claims priority, application Germany July 26, 1958
26 Claims. (Cl. 18—5)

This invention relates to hollow plastic articles and their manufacture, more particularly to the manufacture by blowing.

For the purpose of my present invention, any plastic material may be used which is capable of becoming softened and plastic when heated at relatively low temperatures and which, while soft and plastic, may be expanded under fluid pressure into articles of desired shapes. The blown articles, on cooling, lose the plasticity inherent in the heated and soft material and assume a condition which permits, for instance, stamping, punching, cutting. For example, polyethylene and polyvinyl chloride may be used.

In producing hollow articles, such as, for instance, bottles, from plastics by blowing, an open-ended tube may be extruded from an annular extrusion nozzle which is mounted above a sectional mold into the space between the open sections of the mold to have the leading end of the tube slip over a so-called blow pipe which projects into the open mold space from opposite the extrusion direction and in alignment with the extruded tube. As soon as a sufficient length of the open-ended tube is extruded, the mold sections are closed over a segment of the tube, which causes the latter to be pinched shut by the mold sections near the nozzle. At the end of the tubing remote from the nozzle, the material is pressed against and around the blow pipe. The blow pipe serves to admit compressed air or any other fluid pressure medium into the closed tubing segment within the mold and to act at the same time as a core to form an opening in the article being produced. The fluid pressure medium admitted through the blow pipe expands the mold-enclosed tubing segment against the cavity provided in the mold. The molded article, upon cooling and when sufficiently resistant to deformation, is withdrawn from the opened mold.

If, for instance, a closed-ended bubble is extruded into the space between open mold sections, with a view to inflating such bubble, a blow pipe is used which pierces the bubble and then serves to admit fluid pressure and to form an opening which will appear in the finished article.

Thus, it is generally a blow pipe of the referred to types, that is used to form the desired opening in the blown hollow article. This is true even if a mold is used that has more than one cavity, and if more than a single article is to be blown at the same time. With the use of a multiple-cavity mold, as many blow pipes are ordinarily used as there are cavities. In FIGS. 1 and 2 of the copending application Serial No. 513,852, filed June 7, 1955, by Reinold Hagen and myself, it is shown, by way of example, that twenty containers are blown at any one time and that twenty blow pipes are in use, regardless of the fact that according to the referred to copending application the initial plastic material used is in sheet form rather than in tubular form.

It will readily be appreciated that the need for use of a blow pipe to form an opening in the article to be blown constitutes a highly constraining factor. The constraint affects the range of plastic articles, such as otherwise could be made by blowing, and also the general construction of apparatus for blowing plastic articles.

It is an important object of my present invention to do away with blow pipes as the only means for forming openings in blown plastic articles. Associated with this object is the object to widen the range of utilization of processes and apparatus for making plastic articles by blowing.

Another object of the invention is to generally improve the manufacture of hollow plastic articles by blowing, and more particularly, to simplify, cheapen, and speed up the manufacture.

The primary object of this invention is to form plastic articles by blowing and to provide in the blown articles, in the same operation, such openings as are desired.

A more specific object of the present invention is to improve the manufacture of plastic tubes, as used to hold paints, dental cream, etc. To distinguish the kind of containers, from which, for instance, a paste may be squeezed, from extruded hollow cylinders, the former will be referred to in the following portion of the specification and in the claims, wherever some doubt could develop, as "container tubes."

It has been known for some time to make plastic container tubes by starting from extruded plastic tubing, cutting such tubing into open-ended cylinders of the desired length, and injection-molding the outlet end piece of the usual conical neck type onto one end of the cylinders. The known manufacture of plastic container tubes has various disadvantages, and these disadvantages center mainly about a lack in economy in the manufacture and about wanting strength of the finished product. Extruded tubing has to be divided, each individual smaller piece of tubing has to be held ready for a subsequent injection-molding operation, and has to be united with an outlet part by injection molding. Each of these three operations constitutes a separate operation. Further, container tubes made in the referred to manner consist of two joined portions, which is unsatisfactory since the joint is weaker than the rest of the tube and often does not afford the required strength.

It is also known to make plastic container tubes in the same manner as other hollow plastic articles are made, that is, by blowing, but none of the known blowing methods proved satisfactory.

When producing hollow plastic articles by blowing, freshly extruded open-ended tubing may be started with, as has been pointed out hereinbefore. Other starting shapes may be used as well. When applying any of the known blowing methods to the manufacture of plastic container tubes, a bottomed product is obtained. As is known, container tubes are generally filled at the bottom end since the outlets are ordinarily too small to permit quick and economical filling. Thus, in the case of blown bottomed container tubes, while outlet part and cylindrical body are integrally formed with one another, it is necessary to remove the bottom, and such removal, apart from constituting an additional operation, often leads to nonuniform tube lengths. Materials used for making tubes, even when cold, retain a certain degree of elasticity, which makes it difficult, if not impossible, to produce equally long tubes, and it will be apparent that a lack of uniformity entails conditions, which, of necessity, make themselves felt in a most unsatisfactory manner during the subsequent operations of filling and closing the tubes. Therefore, a further operation is required to cut non-uniform lengths to correct size.

Accordingly, it is a further object of the present invention to overcome the drawbacks inherent in the known plastic container tubes and their manufacture. Specifically, it is an object of my invention to do away with the referred to uneconomical separate operations and to make instead use of the advantages offered by plastic blowing methods, at the same time, however, also overcoming the disadvantage of having to cut the bottom from the blown products.

My invention aims at speeding up and greatly cheapening the manufacture of plastic container tubes. Tubes ready for filling are made in a single operation.

One object of my present invention is the provision of a method and an apparatus, according to which freshly extruded tubing is used to start with, and completely finished container tubes are discharged.

My invention makes it possible to provide openings in blown articles at any desired place, as has been indicated hereinbefore, and in any desired number.

Carrying my invention further, it has also the manufacture of ringlike plastic articles by blowing for one of its objectives, ringlike articles constituting hollow articles having openings at opposite places.

Still another object is directed toward hollow plastic articles having one or more openings, and being provided with fitting covers for such openings.

Basically, the foregoing and such other objects of the invention as will be apparent from the following description are achieved by providing that an intermediate product be blown, rather than the final article, and that the intermediate product be converted into the final article. The intermediate product is made from an embryo or inflatable product which is closed except for an opening through which a blow pipe passes, and thus the intermediate product is closed, too, with the exception of the blow pipe opening. The present invention offers the solution to the problem of how to make in a single operation a final article that has at least a single opening apart or different from the blow pipe opening.

I employ, according to the invention, a sectional mold which, when in blowing position, defines at least a single composite cavity conforming in shape to an intermediate, not the final product. The cavity and, therefore, the intermediate product to be blown therein have at least a single dilated portion. The mold includes at least a single pair of sections and at least a single part, whereby the sections are mounted to be moved horizontally toward and away from each other. At least one of the mold sections and the mold part are mounted to be relatively movable at least toward and from each other in any direction. The mold sections and mold part are adapted to form from the initial plastic material used, on closing the mold, at least a single embryo or inflatable product within the mold. There is an opening in the closed mold, and a blow pipe passes through said opening to admit any suitable pressure medium to expand the inflatable product to the intermediate product. At least one of the mold sections and the mold part are shaped so as to cut off, on moving toward each other, portions of the intermediate product, thereby forming the final article having the desired opening or openings apart from the opening through which the blow pipe has passed. The desired openings appear where there were no openings in the intermediate product.

The present invention provides that the mold sections and mold parts which are movable with respect to each other, do the cutting, when being moved toward each other, in the region of the dilated portion or portions of the intermediate product.

The specification is accompanied by drawings in which:

FIG. 1 is a vertical section through a mold embodying features of the present invention, the mold including three pairs of sections adapted to be closed and opened;

FIG. 2 is a fragmentary vertical section through one half of the mold of FIG. 1, also indicating a blown product lying against the interior wall of the mold half;

FIG. 3 is a fragmentary vertical section through the other half of the mold of FIG. 1, illustrating a condition assumed subsequently to that shown in FIG. 2;

FIG. 4 is an elevational view of a container tube as withdrawn from the apparatus of FIGS. 1 to 3;

FIG. 5 is a fragmentary vertical sectional view of one half of a modified mold of the invention;

FIG. 6 is a fragmentary vertical section through one half of another modified mold according to the invention;

FIG. 7 is a fragmentary vertical section through the mold half complementing the half of FIG. 6;

FIG. 8 is a fragmentary vertical section through two halves of a further modification of a mold of the invention, the halves being shown in different positions, the blown intermediate product being also shown;

FIG. 9 is a longitudinal sectional view of an intermediate product as may be blown in the mold of FIG. 8;

FIG. 10 is a fragmentary section of an article obtained, upon conversion, from the final article obtained, in turn, from the intermediate product of FIG. 9;

FIG. 11 shows a vertical section through a further modification of a mold of the invention;

FIG. 12 shows, in a vertical sectional view, still another mold modification;

FIG. 13 is a fragmentary vertical sectional view through one half of a modified mold;

FIG. 14 is a vertical section through a further mold modification;

FIG. 15 illustrates an intermediate product as obtained when working according to the invention;

FIG. 16 shows fragmentarily, in a longitudinal sectional view, a modified type of intermediate product.

FIG. 17 shows an article obtained, upon conversion, from the final article obtained, in turn, from the intermediate product of FIG. 16;

FIG. 18 is a vertical section through yet another mold of the invention;

FIG. 19 is a longitudinal sectional view through a final article according to the invention;

FIG. 20 is a plan view of the article of FIG. 19; and

FIG. 21 shows the final article as obtained with the mold of FIG. 14.

Referring to the drawings in greater detail now, and initially to FIGS. 1 to 3, a mold to form a plastic container tube generally designated 10, consists substantially of three pairs of sections, namely, 11, 11'; 12, 12'; and 13, 13', these three pairs of mold sections being shown in closed condition. The six sections complete each other to define interiorly a composite cavity corresponding in shape to an intermediate product which is between an embryo product and the tube to be made. The mold sections 11, 11' are shown to be provided with fluid chambers 14, 14' to cool the temperature of the mold.

With the mold in open condition, that is, with the sections 11, 12 and 13 separated from the sections 11', 12' and 13', it is possible to extrude plastic material from an extrusion nozzle (not shown) above the mold to suspend vertically into the open mold space. If the extrusion nozzle has an annular outlet orifice, material of tubular shape is extruded. As soon as the required length of tubing is extruded, the mold sections 11, 11'; 12, 12'; and 13, 13' are moved horizontally toward each other to be closed.

The upper surfaces of the mold sections 12, 12' are beveled at 15, 15' to form sharp edges at 16, 16' to pinch, for instance, extruded tubing at 16, 16', when the mold is being closed, and thus to seal the segment of the tubing enclosed within the mold. The sections 13, 13' press-mold a portion of the extruded tubing at the free end of the latter against and around a blow pipe 17 which enters the cavity from below, in alignment with the extrusion direction, and is provided to admit fluid pressure to the fully enclosed tubing segment within the closed mold. The blow pipe 17 and the sections 11, 11' and 13, 13' cooperate to form the outlet part of the tube, and the sections 13, 13' in particular form the exterior screw thread for the screw cap of the tube.

The sections 12, 12' in addition to being movable from and toward each other, as the sections 11, 11' and 13,

13' are, are also movable relative to the mold sections 11, 11' in the direction of the vertical axis of the mold. In FIGS. 1 and 2, the sections 12, 12' are shown in the tube-blowing position which is assumed by them upon closing of the mold.

There are tie rods 18, 18' which are slidingly guided in lateral extensions 19, 19' of the mold sections 11, 11'. The tie rods are connected with the mold sections 12, 12' to impart to the latter a movement toward the mold sections 11, 11' and are actuated by any suitable means, such as levers 20, 20', eccentrics, the latter being not shown. They may also be pneumatically or hydraulically operated. The sections 12, 12' are provided, for their proper guidance, with downwardly directed curved walls 21, 21' which are matingly received in depressions 22, 22' in the mold sections 11, 11'.

Upon the closing of the mold, fluid pressure, for instance, compressed air, is admitted through the blow pipe 17. The tubing segment which constitutes the "embryo" product is expanded to the interior shape of the closed mold. The product thus formed is an intermediate product which is indicated in FIG. 2, and one half of which consists of parts 23, 24, and 25. A coolant flowing through the chambers 14, 14' helps cool the intermediate product.

It is now that the mold sections 12, 12' are pulled from their normal or blowing positions, by means of the tie rods 18, 18' and against the action of return springs 26, 26', downwardly or toward the sections 11, 11' to assume positions corresponding to that indicated in FIG. 3 as far as the mold section 12' is concerned. The mold sections 11, 11' are provided with sharp edges at 27, 27' (see FIG. 1), intended for cooperation with the flat surfaces 28, 28' of the sections 12, 12', when the latter reach the downmost position (shown in FIG. 3), to perform a cutting action. Such cutting divides the intermediate product into three fully separated parts identified by 29', 30', and 31', these parts being clearly shown in FIG. 3. The plastic material, at the time of cutting, has sufficiently cooled down to be sure that the parts 29', 30', and 31' will not adhere to one another. The part 31' forms a portion of the bottom part 25, and the part 30' is more or less identical with the part 24. Upon the cutting along the semicircular lines 27, 27', the parts 30' and 31', as well as the corresponding parts 30 and 31, which are not designated, form waste. The remaining part 29' and the corresponding part (not designated) form the final article which has no bottom, is open at the bottom end, and has been produced in a single operation, the cylindrical main body of the container tube and the outlet part being integrally formed with each other.

From the foregoing description it appears that the cutting edges 27, 27' are called upon to cut through two thicknesses of the intermediate product (see FIG. 2). To reduce the wear of the cutting edges 27, 27', the movement of the mold sections 12, 12' may, however, be so controlled that the cutting edges will not engage the flat surfaces 28, 28' of the sections 12, 12' and will cut through a single thickness only, rather than through two thicknesses. In this case, the cutting will result in two separate parts, the part 29' and a part that is integrally formed by parts 30' and 31'.

As soon as the actuation of the tie rods 18, 18' has come to an end, the springs 26, 26' return the mold sections 12, 12' to their normal positions shown in FIG. 1.

The mold is opened, and the separate parts 29', 30' and 31', as well as the corresponding parts which are not designated, are ready to be discharged. The part 29' and the corresponding part (not designated) form together with the outlet part 32 the finished tube 29, 29' (see FIG. 4). The tube is provided with a screw cap and may be filled immediately, and the end 33 of the tube is, for instance, cemented or welded together upon filling.

It should, of course, be understood that the work of the two pairs of mold sections 11, 11' and 13, 13' could be done by a single pair of sections as well.

In the embodiment shown in FIG. 5, the arrangement of the bottom-severing cutting edges and cooperating flat surfaces, as shown in FIGS. 1 to 3, is reversed. It is the mold section 12*a* that is provided with a cutting edge C to cooperate with a flat surface F of the mold section 11*a*. Upon blowing the intermediate product, the mold section 12*a* and its complementary or companion section (not shown) are lowered to the dash-dot position so that the intermediate product may be cut along the line 34 and the complementary line (not shown). The resulting finished container tube has no bottom but a radially outwardly projecting flange or rim 35. This rim stiffens the bottom end of the tube somewhat and ensures that the open bottom end maintains its circular shape throughout the filling. At the same time, I have found that the rim does not affect the closing of the open bottom end unfavorably. The rim may be used to support a clip or the like to close the open bottom end.

In each of FIGS. 6 and 7, two sections of another embodiment of a sectional mold are shown. The mold is constructed for the manufacture of container tubes. The sections 36 and 37 of FIG. 6 and the sections 36' and 37' of FIG. 7 complete each other, so that FIGS. 6 and 7, when considered together, illustrate two pairs of sections of the same mold and are explanatory of the latter's operation. The section 37 which is shown in FIG. 6 in the tube-blowing position is provided with a conical surface 38 designed to cooperate with a cutting edge 39 provided on the section 36. When the section 37 is lowered in a manner and for the purpose, as has been explained with respect to FIGS. 1 to 3, and assumes a position corresponding to that shown in FIG. 7, the cutting edges 39, 39' pinch the wall of the blown intermediate product (not shown) and separate the cylindrical main body of the intermediate product from the bottom part and thus yield the final container tube.

In FIG. 8, on the left-hand side, two sections 40 and 41 of a mold are shown in blowing or in their moved-apart position. On the right-hand side, the two companion sections are designated 40' and 41' and shown moved toward each other. The sections 40 and 40' are provided with cutting edges 42 and 42'. It will be noted that the cutting edges are outwardly offset with respect to the cylindrical cavity wall of the sections 40, 40'.

What is referred to in this specification and the appended claims as the dilated portion of the intermediate product is constituted in the case of FIG. 2 by the parts 24. From FIG. 2 it will be seen that the dilated portion is located immediately outwardly of the cylindrical cavity wall. While no dilated portion of the intermediate product is shown in FIG. 5, it will be clear that the dilated portion is to be thought to be outwardly of the cutting edge C and the outer periphery of the rim 35, that is, spaced from the cylindrical cavity wall.

In the intermediate product shown in the left-hand view of FIG. 8, the dilated portion is spaced or distanced from the cylindrical walls 43 and 44 of the intermediate product. When viewed in cross section, the dilated portion is substantially of U-shape and consists, as is shown in FIG. 9, of flanges 45, 46, and a connecting part 47.

When the mold sections 41 and 41' have been moved to the position shown in the right-hand view of FIG. 8 to effect the cutting and when the sections 41, 41', after the cutting, have been allowed to return to the position shown in the left-hand view, the final article is ready for the discharge. FIG. 9 shows, by way of example, an intermediate product as produced in the mold of FIG. 8. The cutting has been done along the line 48, so that in addition to the main body 49 of the final article, a bottom part 50, and the connecting part 47 are to be withdrawn.

It will be seen that the wall 44 of the bottom part 50 has a smaller diameter than the main body 49, which makes it possible to turn the bottom part through 180° and to insert same into the main body, as is shown in FIG. 10. The flange 45 of the main body and the flange 46 of the bottom part 50, after the container has been filled, are welded together or in any other way joined. Thus, there will be an outwardly projecting rim on the filled and closed container, which is formed by the two flanges 45 and 46 and stiffens the bottom portion of the container and affords a greater stability than known plastic containers have.

Even if the diameter of the cylindrical wall of a bottom part as exemplified in FIGS. 9 and 10 is not smaller than, but approximately equal to, the diameter of the cylindrical main body, the bottom part may still be inserted in the manner shown in FIG. 10, due to the resiliency of the material.

The mold shown in FIG. 11 consists substantially of two pairs of sections, the sections 51, 51′ and 52, 52′, and is intended also for the manufacture of container tubes. The sections 51 and 52, on the one hand, and the sections 51′ and 52′, on the other, are movable horizontally toward and from each other. In addition, the sections 52 and 52′ are movable in the direction of the vertical axis toward and from the sections 51, 51′. For proper guidance of the sections 52, 52′ with respect to the sections 51, 51′, the former are provided with curved walls 53, 53′ which are received in matingly shaped depressions provided in the sections 51, 51′. Levers 54, 54′ mounted to swing about journals 55, 55′ cause the sections 52, 52′ to move from the position shown to a position closer to the sections 51, 51′, and springs 56, 56′ will return the sections 52, 52′ to the position shown.

The mold of FIG. 11 differs from the mold of FIGS. 1 to 3 primarily in the arrangement of the blow pipe. In the construction of FIGS. 1 to 3, the blow pipe enters the tube cavity at the outlet end thereof, whereas in the construction of FIG. 11 the blow pipe 57 enters the cavity at its bottom end. Thus, with the mold in closed condition as shown in FIG. 11, the sections 52, 52′ have an opening to allow the blow pipe 57 to pass therethrough.

The manufacture of tubes, when using the mold of FIG. 11, includes the extrusion, for instance, of open-ended tubing of plastic material into the space between open mold sections. The tubing is extruded to suspend downwardly and to have its open free end slip over the blow pipe 57. It will, of course, be understood that here as in the case of the construction of FIGS. 1, 2 and 3 closed-ended tubular material and other extruded shapes may be used as well. The blow pipe 57 of FIG. 11 is shown to be pointed at 58 so that a closed-ended formation, for instance, a bubble, will be pierced, allowing the pierced end portion of the bubble to slide over the blow pipe. Upon the closing of the mold, a pressure medium is admitted through the channels 59 and 60 in the blow pipe to expand the embryo or inflatable form to the intermediate shape which corresponds to the composite cavity of the mold, and upon cooling of the plastic material, the sections 52, 52′ are moved closer toward the sections 51, 51′. Cutting edges 61, 61′ provided on the sections 51, 51′ engage the flat surfaces 62, 62′ of the sections 52, 52′ and divide the blown intermediate container into three parts, the final article with no bottom, the bottom which is centrally apertured and constitutes waste, and waste collected in the spaces S, S′. The mold is then opened, and the finished tube and waste material are withdrawn.

Due to the provision of the blow pipe at the bottom end of the cavity, the outlet end of the finished tube made with the aid of the mold of FIG. 11 is closed. The production of a tube having a closed outlet end offers the advantage that the screw cap need not be put in place prior to the filling the tube. The cap may be screwed on after filling, and the user of the filled tube will be in a position to easily pierce the outlet with a needle or the like.

The sections 52, 52′ are preferably provided with cutting edges 63, 63′ which during the return movement of said sections from the position close to the sections 51, 51′, not shown, into the position shown will remove any excess material.

According to a modification of a sectional mold according to the invention, two mold sections which are mounted to move from and toward each other cooperate with a mold part which is guidingly mounted on a support for a movement toward and away from said pair of mold sections. It will be apparent that in order to close the mold, first, the mold sections are moved into closing position, with the mold part being out of the way. Then, the mold part is moved into its closing position. To open the mold, first, the mold part is moved out of the closing position, and then the sections open.. The mold sections are provided with cutting edges to cooperate, on moving the mold part from the tube-blowing into the bottom-removing position, with the flat top of the mold part to separate waste including the bottom from the intermediate product, and thus to deliver, for instance, a bottom-free tube of correct length in a single operation.

The mold shown in FIG. 12 consists of two sections 64 and 64′ and a pistonlike part 65. The mold sections are mounted to be moved toward and from each other. The section 64 has a hole 66 in which the part 65 is received for a reciprocal movement in the closing and opening directions of the sections 64, 64′.

The manufacture of hollow plastic articles, when using the mold of FIG. 12, is very similar to the procedures already described hereinbefore. Any suitable shape of plastic material is extruded to suspend downwardly between the sections 64, 64′ while open. The closing of the mold sections leads to the formation of an inflatable product which is inflated by admitting an inflating medium through a blow pipe 67. The plastic material expands to the inner walls of the mold and hole 66 and is thus formed into an intermediate product. The part 65 which is shown in its blowing position is provided, on the side adjacent to the hole 66, with a cutting edge 68. As soon as the plastic material has become sufficiently cool, the part 65 is moved to the right, when viewed at the drawing, whereby the cutting edge 68 will engage the opposing surface 69 and cut through a double thickness of the plastic material. This cut will divide the intermediate product into three separate parts, a part 70, a part 71 collecting in the narrowing space 72, and a final product 73 provided with an opening. The parts 70 and 71 constitute waste.

From FIG. 12, it appears that the final article will be undercut at the surface 69. However, such undercut will cause no difficulty in discharging the final article, due to the elasticity of the cooled material, so that the usual mechanical or air-blast facilities will suffice to move the undercut of the final article around the relieved portion 74 of the mold section 64, and remove the final article from the mold.

It will be appreciated that a hole like the hole 66 of FIG. 12 may also be provided, turned through 90°, between two mold sections, in which case a relief like the one shown in FIG. 12 and there designated 74 will be formed by both mold sections and the two relieved halves will be fully free to be withdrawn behind the undercut.

In FIG. 13, a construction is shown whereby a shearing action is effected rather than a cutting action. Thus, whenever in this specification and in the claims mention is made of "cutting" such mention is intended to include "shearing" as well. The mold section 75, in the construction of FIG. 13, is provided with depressions 76 and 77 to receive, respectively, a guiding wall 78 and a shoulder portion 79 of the mold section 80. When the sections 75 and 80 are moved toward each other, the wall 78 enters the depression 76, and the shoulder 79 enters the depression 77. The edges 81 and 82 act like the cutting edges of a pair of shears.

In the construction of FIG. 14, the mold is shown to consist of five pairs of sections. The sections 83 and 83' of the central pair are movable toward and from each other, whereas the sections of each of the four other pairs are movable horizontally relatively to each other and also with respect to the sections of the central pair. Plastic material is extruded from above the mold to suspend downwardly into the space between the open mold sections. An open-ended tube, for instance, will slip over the blow pipe 84 and will, when the mold closes, be pinched at P to form an inflatable product. A fluid pressure medium expands the inflatable product to an intermediate product generally designated 85. The intermediate or expanded product is shown to be dilated at the four places *a*, *b*, *c*, and *d*. Upon cooling of the intermediate product, the sections 86, 86' and 87, 87' are moved in axial or vertical direction downwardly toward the sections 83, 83', and the sections 88, 88' and 89, 89' are moved upwardly in axial direction toward the sections 83, 83'. The mold sections 83, 83' are provided with cutting edges at 90, 90' and 91, 91' to engage and cooperate with opposing flat surfaces of the adjacent sections 87, 87' and 88, 88'. The endmost mold sections 86, 86' and 89, 89' are provided with cutting edges 92, 92' and 93, 93' to engage flat surfaces of the sections 87, 87' and 88, 88', respectively. The cutting actions thus effected divide the intermediate product into five products, in addition to the waste occurring at *a*, *b*, *c*, and *d*. The five products include two profiled rings R*a* and R*b*, a top, central and bottom part. The shape of the profiled rings corresponds to the interior formation of the mold sections 87, 87' and 88, 88'.

The sections 86, 86' and 87, 87' are moved downwardly by means of tie rods 94, 94' which are connected to the sections 86, 86' at 95, 95' directly, and to the sections 87, 87' by means of oval holes 96, 96' and pins 97, 97'. Upon actuation of the tie rods 94, 94', with the aid of levers 98, 98', for instance, first, the sections 86, 86' are moved, against the force of return springs 99, 99', in the direction of the arrow 100. The movement of the sections 86, 86' with respect to the sections 87, 87' comes to an end as soon as the former have reached their cutting position, that is, when the cutting edges 92, 92' have engaged the opposing flat surfaces. While the sections 86, 86' proceed from their blowing to their cutting position, the oval holes 96, 96' provided in the tie rods move until, at the end of the relative movement of the sections 86, 86' and 87, 87', the upper ends of the oval holes engage the pins 97, 97' carried by the sections 87, 87'. As the tie rods continue their downward movement, the oval holes take the pins together with the sections 87, 87' along, so that the sections 87, 87' together with the sections 86, 86' move downwardly. The downward movement of the two pairs of sections 86, 86' and 87, 87' proceeds until the flat surfaces opposing the cutting edges 90, 90' engage the latter. The cutting of the cutting edges 92, 92' is effected first, and the cutting of the cutting edges 90, 90' thereafter. Upon cutting, the tie rods 94, 94' are returned by springs 99, 99' to their normal position, also returning the sections 86, 86' and 87, 87' to their normal or blowing positions.

The operation of the mold sections 88, 88' and 89, 89' is exactly the same as that of the sections 86, 86' and 87, 87' except that the movements are directed in opposite directions (see the arrow 101).

With the provision of oval holes in the tie rods, as will correspond to the individual case, mold constructions may be used which include any number of pairs of sections, for instance, three pairs, rather than two as shown in FIG. 14, on each side of a pair that is nonmovable in axial direction.

In FIG. 15 an intermediate product is shown, as may be produced in a kind of mold shown in FIG. 14. The intermediate product is of bellowslike shape. The mold used has end sections that are axially movable with respect to mold sections intermediate the end sections. The intermediate sections which form two zigzag bodies are grouped in two pairs, which two pairs are axially movable relatively to each other. Upon blowing an inflatable plastic product into contact with the cavity walls, and forming the intermediate product, and upon cooling of the intermediate product, the two groups of intermediate sections are moved toward each other, so that cutting means suitably provided will perform a cutting action along the line 102. In addition, the end sections are moved toward the horizontal medium plane of the intermediate product to cut the horizontal end parts 103 and 104 along the line 105 and 106, respectively.

Reverting to FIG. 9, the intermediate product shown has a dilated portion which is a distance away from the bottom end. As distinguished therefrom, FIG. 16 illustrates an intermediate product for a tube container, wherein the leg 107 of the U-shaped dilated portion merges into the flat bottom part 108. The intermediate product as shown in FIG. 16 is produced in a form as shown in FIG. 5. The cutting is done along the line L and separates the bottom part 108 together with the leg 107 from the main body 109, also leading to a bridging piece 110 of waste material. The main body 109 is provided with a rim 111 which, in the intermediate product, forms the other leg of the U-shaped dilated portion. The main body 109 forms a container tube with an open bottom end. After filling the tube, the bottom 108 with rim 107 may be placed upon the open end, with rim 107 upon rim 111, as shown in FIG. 17, and the rims may be welded together. The two rims reinforce and stiffen the tube.

The mold of FIG. 18 consists, somewhat similar to the mold of FIG. 12 of two sections 112 and 112' and a pistonlike part 113. The sections 112, 112' are supported to be moved horizontally toward and from each other. The section 112 has a hole 114 which, however, does not extend in the closing and opening directions of the sections 112, 112', but angularly thereto. The part 113 which is mounted to reciprocate in the hole 114 is provided with a cutting edge 115 to convert an intermediate product into a final container having on top thereof an angularly opening aperture.

My invention provides further to produce a final article as shown in FIGS. 19 and 20. In this product, the container proper 116 and a cover 117 are not two separate parts, prior to their joining together, as shown in FIGS. 10 and 17, but parts which are connected one to the other. In the mold used for making an article as shown in FIG. 19, the cutting means do not separate the cover part from the main part completely but allow the cover part to stay connected to the main part by a web 118. For this purpose the cutting edge, wherever provided, is interrupted at one place, whereby the width of the web will correspond to the length of interruption. Upon filling the container, it is easy enough to turn the cover 117 through 180° and to place it over the opening 119, leaving the web intact for the time being. Container and cover are then welded or in any other way joined together, and while the joining is done, the web may be cut off. The partial removal of the dilated portion has the advantage that container and the cover pertaining thereto remain together during the subsequent operations.

FIG. 21 shows, in an axial longitudinal section, a profiled ring as obtained with the mold of FIG. 14.

It is believed that the method and product of my invention, as well as the construction and operation of the forms of apparatus for practicing the invention, as shown, and the many advantages thereof, will be fully understood from the foregoing detailed description. Some of these advantages and some of the features of the invention are reviewed hereinafter.

While this invention includes a plastic blowing method and blowing equipment, and while a product has to be closed in order to be inflatable, except for an opening through which a blow pipe passes, the invention makes it possible to arrive in a single operation at final articles which may have openings at any place and in any number. According to the invention, it is an intermediate product that is blown, rather than the desired article, and the intermediate product is then converted into the final article. The intermediate product has a least a single dilated portion, and there are mold parts which permit a relative movement, with the mold still in closed condition, which relative movement effects a cutting action in the region of the dilated portion and leads to the formation of the final article having the desired opening or openings.

The dilated portion may be of U, S, M, L-shape, or any other shape, and the cutting action may be effected in different ways. According to FIGS. 1, 2 and 3, there are cutting edges or knives on the main body-forming sections, and cooperating opposing flat surfaces on the sections at the bottom end of the container tube being produced. FIG. 5 illustrates knives on the sections at the bottom end of the container tube being produced. FIGS. 6 and 7 are selected to illustrate the cooperation of cutting edges with opposing inclined surfaces. In FIG. 13, a shearing action is shown.

Considering FIGS. 1 and 11, it will be seen that, while both constructions lead to a container tube, the tube produced in the mold of FIG. 1 has an open outlet, and the tube produced in the mold of FIG. 11 has a closed outlet.

FIG. 14 is explanatory of a method and an apparatus, permitting the manufacture of profiled rings in any number in a single operation.

It will be seen from the foregoing description that the invention permits the manufacture of articles of any cross section and shape. The cutting may be done along a line lying in a horizontal or inclined plane, or along a curved line. No difficulty is encountered to make according to the invention, for instance, a vase having a scalloped or any oddly shaped opening edge. The mold constructions of the present invention may be adapted to various blowing methods, and used with various apparatus for producing hollow plastic articles. It is apparent that the mold of the invention may be operated in the manner disclosed in the copending application Ser. No. 793,045, filed by Reinold Hagen and myself February 13, 1959. The present invention is also fully applicable to a principle of blowing, whereby no blow pipe is used but a hollow needle, as shown, for instance, in the Patent 2,515,093 to E. E. Mills, dated July 11, 1950. According to this patent, fluid for inflating purposes is forced into an inflatable product through a hollow needle. When operating according to the present invention, and using a hollow needle for the admission of the inflating medium, openings in intermediate products are made in the same way as has been shown and explained hereinbefore.

Thus, it will be clear that while I have shown and described my invention in a few preferred forms only, many changes and modifications may be made without departing from the spirit of the invention defined in the following claims.

I claim:

1. Apparatus for the manufacture of hollow plastic articles by blowing, comprising a sectional mold defining, when in blowing position, at least a single composite cavity conforming in shape to an intermediate product, the cavity having at least a single dilated portion and thus yielding an intermediate product having also a dilated portion, the mold including at least a single pair of sections and at least a single part, said sections being mounted to be moved horizontally toward and from each other, at least one of the mold sections and the mold part being mounted to be relatively movable at least toward and from each other in any direction, the mold sections and mold part being adapted to form from the initial plastic material used, on closing the mold, at least a single inflatable product within the mold, the mold, when closed, having a single opening, a blow pipe passing, with the mold in closed condition, through said opening to admit an inflating medium to expand the inflatable product to said intermediate product, at least said one mold section and mold part being provided with complementary means to cut off, on moving at least said one mold section and mold part toward each other, portions of the intermediate product in the region of the dilated portion thereof to form the final article.

2. In the apparatus according to claim 1, the mold including, besides said pair of sections, at least two parts, said mold parts being mounted to be movable toward and from at least one of the mold sections in any direction.

3. In the apparatus according to claim 1 for the manufacture by blowing of hollow plastic articles having at least a single opening, besides the blow pipe opening, said complementary means being provided to form, while cutting, said first named opening in the finished article.

4. In the apparatus according to claim 3, said cavity and the intermediate product to be blown therein having a bottom end, the dilated portion being at said bottom end, said complemenary cutting means forming said opening at the bottom end of the finished product.

5. In the apparatus according to claim 1, the mold including, besides said pair of sections, two parts constituting a second pair of sections, the sections of said second pair being mounted to be moved horizontally toward and from each other and vertically toward and from the first named pair of sections.

6. Apparatus for the manufacture of hollow plastic articles by blowing, comprising a sectional mold having, when closed, at least a single composite cavity conforming in shape to an intermediate product, the cavity having at least a single dilated portion and thus yielding an intermediate product having also a dilated portion, the cavity being closed except for a single opening, the mold including at least a single pair of sections and at least a single part, said sections being mounted to be moved horizontally toward and from each other, said sections and part being mounted to be relatively movable toward and from each other at least in vertical directions and being adapted to form from the initial plastic material used, on closing the mold, at least a single embryo or inflatable product within the mold, a blow pipe passing, with the mold in closed condition, through said opening to admit an inflating medium to expand the inflatable product to said intermediate product, means to impart said relative vertical reciprocation of the mold sections and mold part, the mold sections and mold part being shaped to cut, on moving toward each other, portions out of the intermediate product in the region of the dilated portion thereof, and thereby to form the final article.

7. In the apparatus according to claim 6, the mold having a vertical axis and including, besides said pair of sections, two parts constituting a second pair of sections, the sections of said second pair being mounted to be moved toward and from each other perpendicularly to said vertical axis and toward and from the first named pair of sections in the direction of said vertical axis, means to impart the movement of the sections of the second pair toward and from the sections of the first pair.

8. In the apparatus according to claim 7 for the manufacture of container tubes, the cavity having, in addition to at least said single dilated portion, a bottom portion and yielding an intermediate product having also a bottom portion, means provided on the sections of said first and second pairs to cut, on moving the sections of the second pair toward the sections of the first pair, a bottom portion out of the intermediae product, and to form the final article having an open bottom end.

9. In the apparatus according to claim 8, first means yieldingly urging the sections of the second pair away from the sections of the first pair, second means secured to the sections of the second pair to move the latter sections against the force of the first means toward the sections of the first pair, and means to actuate said second means.

10. In the apparatus according to claim 8, the mold being arranged to have the cavity extend vertically and have the tube bottom end on top and the tube outlet end at the bottom, the cavity having said single opening at the tube outlet end, the blow pipe extending into the mold cavity at the tube outlet end in alignment with the vertical axis of the cavity, the sections of the second pair being arranged on top of the sections of the first pair or at the tube bottom end of the cavity, and being provided with means to pinch the initial material used upon introduction of the latter into the open mold space and while in condition of plasticity and upon closing of the mold.

11. In the apparatus according to claim 8, the mold being arranged to have the cavity extend vertically and have the tube outlet end on top and the tube bottom end and said single opening at the bottom, the blow pipe extending into the mold cavity at the tube bottom end in alignment with the vertical axis of the cavity, the sections of the second pair being arranged at the tube bottom end of the cavity, the sections of the first pair being adapted to pinch the initial material used upon introduction of the latter into the open space and while in condition of plasticity and upon closing of the mold, and to form the screw top of the tube.

12. In the apparatus according to claim 11, the sections of the second pair being provided with cutting edges around said opening to remove waste during their movement away from the sections of the first pair.

13. In the apparatus according to claim 6, said cutting means being constituted by cutting edges and inclined opposing surfaces.

14. In the apparauts according to claim 6, said cutting means being constituted by opposing cutting edges operating like the cutting edges of a pair of shears.

15. Apparatus for the manufacture of ringlike plastic articles by blowing, comprising a sectional mold having, when closed, at least a single composite cavity conforming in shape to an intermediate product, the cavity being closed except for a single opening, and having at least two dilated portions and thus yielding an intermediate product also having at least two dilated portions, the mold including at least three pairs of sections, arranged one above the other, the sections of all three pairs being mounted to be horizontally movable toward and from each other, the sections of the outer pairs being mounted to be movable toward and from the sections of the central pair, the mold sections being adapted to form from the initial plastic material used, on closing the mold, an inflatable product within the mold, a blow pipe passing, with the mold in closed condition, through said opening to admit an inflating medium to expand the inflatable product to said intermediate product, means to impart said vertical reciprocation of the mold sections of the outer pairs, the mold sections being shaped to cut off, on vertically moving toward each other, portions of the intermediate product in the regions of the dilated portions and thereby to form the final articles.

16. Process for the manufacture of hollow plastic articles, comprising extruding from an extrusion nozzle at least a single formation of the plastic material used to suspend vertically, in a condition of plasticity, into the open space between sections of a sectional mold, closing the mold about at least a single segment of the extruded formation, the closed mold having at least a single cavity conforming in shape to an intermediate product, forming an embryo or inflatable product within the closed mold, admitting a fluid pressure medium to the inflatable product and thereby expanding same into molding contact with the mold cavity and forming the intermediate product, allowing the intermediate product to cool so as to make molding of the plastic material used impossible but cutting of the material possible, relatively moving a pair of mold sections and at least one other mold section toward each other, thereby cutting off portions of the intermediate product and thus forming the final article, moving said pair of mold sections and said other mold section apart, opening the mold, and withdrawing the final article and the cut off portions.

17. In the process according to claim 16, using a mold defining, when closed, at least a single cavity conforming in shape to an intermediate product having a main body and at least a single dilated portion, said cutting being done in the region of the dilated portion of the intermediate product, thereby cutting off portions of the dilated portion and thus forming in a single operation the final article having an opening where there was no opening in the intermediate product.

18. In the process according to claim 17 for the manufacture of containers having no bottom, forming an intermediate product having a main body and a bottom, the main body having said dilated portion near said bottom, said cutting being done along a line extending in and around the main body and immediately delivering the bottomless container.

19. In the process according to claim 17 for the manufacture of containers having no bottom forming an intermediate product having a main body, and a bottom, the main body having said dilated portion near said bottom, said cutting being done along a line that is outwardly offset with respect to and distanced from said main body, the cutting immediately giving a bottomless container having a rim at the open bottom end.

20. In the process according to claim 17 for the manufacture of containers having an apertured side wall, and forming an intermediate product having a side wall with no aperture and at least a single dilated portion laterally extending in one direction, said cutting immediately yielding the aimed at container.

21. In the process according to claim 17 for the manufacture of articles being open at the opposite ends, forming a single intermediate product having a main body, a top, and a bottom, the main body having at least two dilated portions in a spaced relationship, said cutting being done in the regions of the dilated portions, thereby forming in a single operation a number of the final articles having no tops and bottoms.

22. In the apparatus according to claim 8, said cutting means including opposing cutting edges and plane surfaces.

23. In the apparatus according to claim 6 for the manufacture of containers having no bottom, the mold defining a cavity to yield an intermediate product having a side wall and a bottom portion, said cutting means being provided to cut said bottom portion out of the intermediate product, the cutting being carried out along a line in and around said side wall and resulting in a bottomless final article.

24. In the apparatus according to claim 6 for the manufacture of containers having no bottom, the mold defining a cavity to yield an intermediate product having a side wall and a bottom portion, said cutting means being provided to cut said bottom portion out of the intermediate product, the cutting being carried out along a line outwardly offset with respect to and extending a distance away from said side wall and resulting in a bottomless final article having a rim at the open bottom end.

25. In the apparatus according to claim 24 for the manufacture of containers having a cover fitting the open bottom end, said cutting means being discontinuous, the cutting being carried out partly and resulting in a bottomless container having connected thereto a cover fitting the bottom opening.

26. In the apparatus according to claim 6 for the manufacture of a container having an apertured side wall, the mold defining a cavity to yield an intermediate product having a side wall and at least a single dilated portion laterally extending in one direction, the dilated portion having a closed end member, said cutting means being provided to cut said closed end member out of the intermediate product.

References Cited in the file of this patent

UNITED STATES PATENTS

| | | |
|---|---|---|
| 2,331,688 | Hobson | Oct. 12, 1943 |
| 2,349,177 | Kopitke | May 16, 1944 |
| 2,541,249 | Hobson | Feb. 13, 1951 |
| 2,759,628 | Sokolaff | Aug. 21, 1956 |
| 2,818,197 | Boni et al. | Dec. 31, 1957 |
| 2,890,483 | Soubier | June 16, 1959 |